(No Model.)　　　　　　　　　　　　　　　　2 Sheets—Sheet 1.
J. GREGORY.
MECHANICAL MOVEMENT.

No. 479,593.　　　　　　　　　Patented July 26, 1892.

WITNESSES
H. A. Lamb
Edith G. Ely.

INVENTOR
James Gregory
By H. M. Wooster
Atty.

(No Model.) 2 Sheets—Sheet 2.

J. GREGORY.
MECHANICAL MOVEMENT.

No. 479,593. Patented July 26, 1892.

WITNESSES
H. A. Lamb
Edith Y. Ely

INVENTOR
James Gregory
By H. M. Wooster
Atty.

THE NORRIS PETERS CO., PHOTO-LITHO., WASHINGTON, D. C.

UNITED STATES PATENT OFFICE.

JAMES GREGORY, OF BRIDGEPORT, CONNECTICUT.

MECHANICAL MOVEMENT.

SPECIFICATION forming part of Letters Patent No. 479,593, dated July 26, 1892.

Application filed December 7, 1891. Serial No. 414,265. (No model.)

*To all whom it may concern:*

Be it known that I, JAMES GREGORY, a citizen of the United States, residing at Bridgeport, in the county of Fairfield and State of Connecticut, have invented certain new and useful Improvements in Mechanical Movements; and I do hereby declare the following to be a full, clear, and exact description of the invention, such as will enable others skilled in the art to which it appertains to make and use the same.

My invention has for its object to produce a new mechanical movement which is adapted for general uses of a certain class, and especially adapted as an opening and closing device for the jaws of chucks while the chucks are in motion. Heretofore, so far as I am aware, it has been necessary to stop the motion of a chuck before the article gripped by the jaws could be taken out and to keep it stationary until another article was placed in the jaws and they were tightened up. This necessity or rather defect of construction has been the cause of serious loss of time in use, it being frequently the case that much more time was lost in putting in and taking out the articles than was required to perform the necessary operations upon them while they were in the chuck. In order to overcome this objection and provide an inexpensive, strong, and durable construction which will open or close the jaws instantly and positively without stopping the motion of the chuck, I have devised the simple and novel mechanical movement which I will now describe, referring by numbers and letters to the accompanying drawings, forming part of this specification, in which the movement is illustrated as applied to a chuck.

Figure 2:
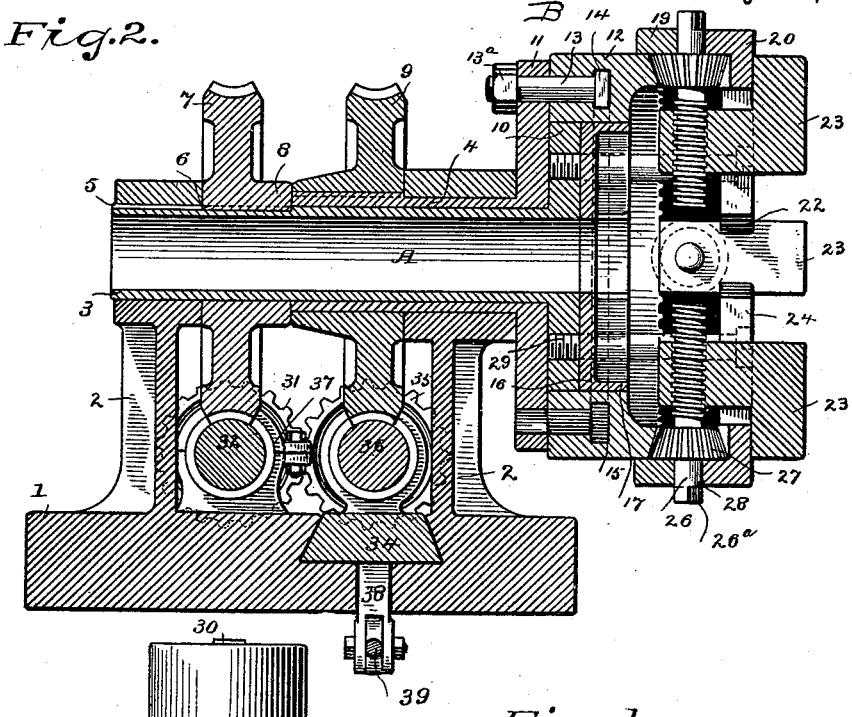
Figure 1:
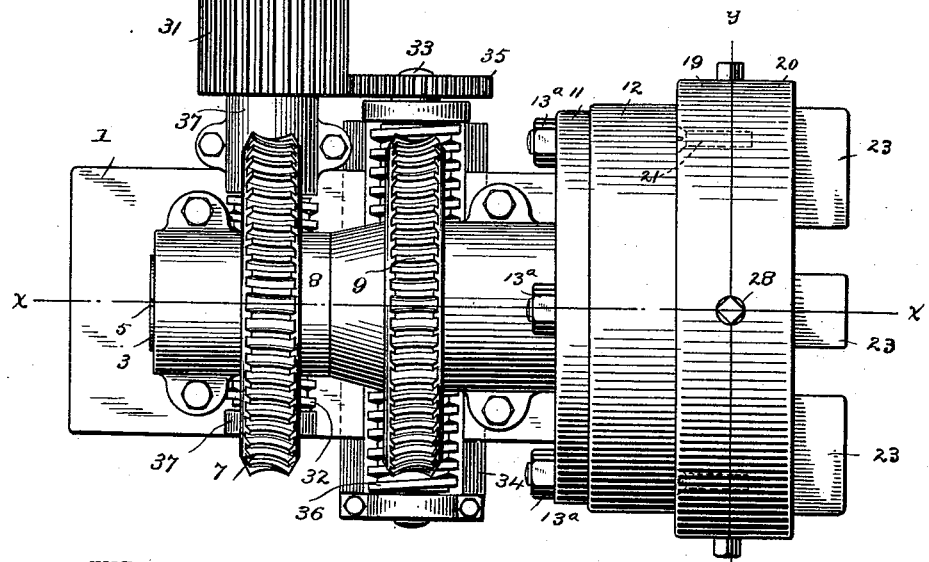
Figure 4:
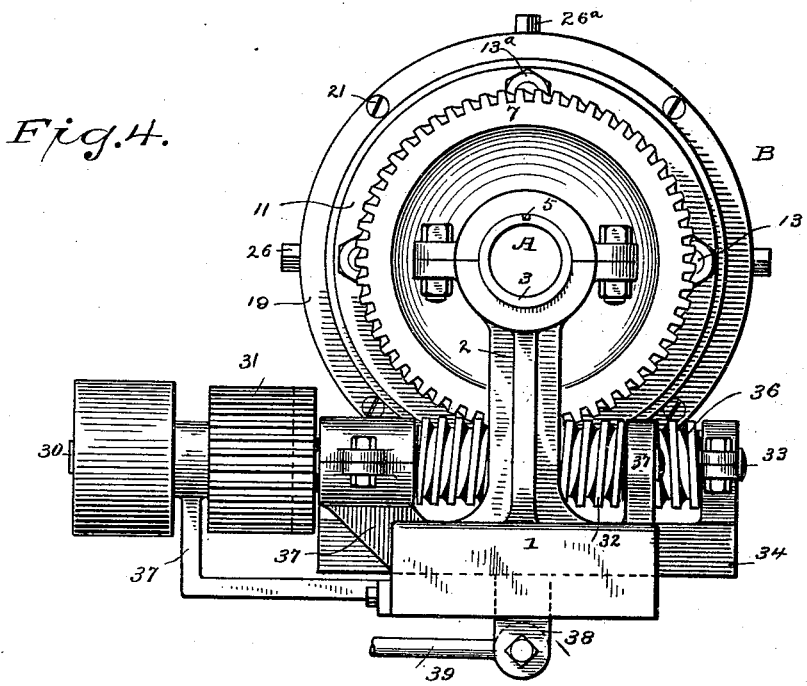
Figure 3:
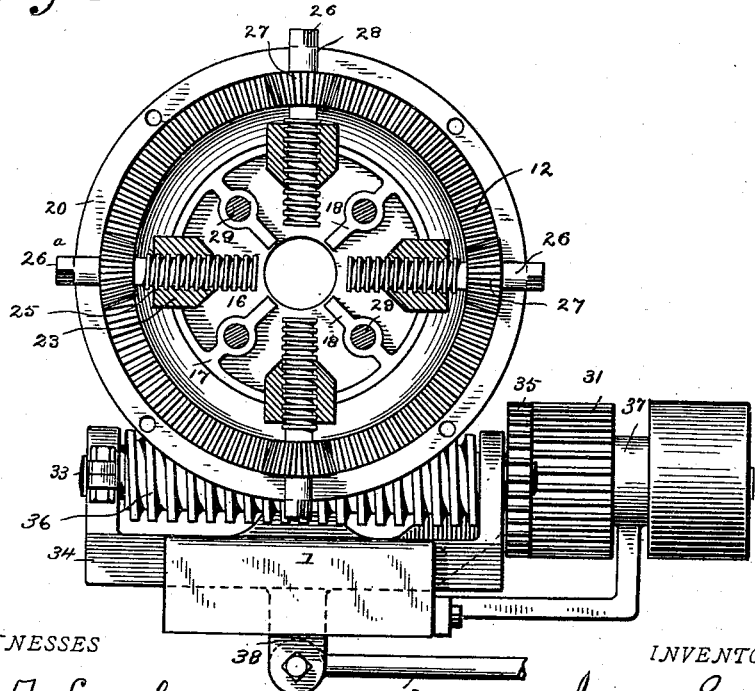

Figure 1 is a plan view; Fig. 2, a section on the line *x x* in Fig. 1; Fig. 3, a section on the line *y y* in Fig. 1, looking toward the left; and Fig. 4 is an end elevation, as seen from the left in Fig. 1.

1 denotes a suitable base, and 2 standards extending upward therefrom, in which the mandrel A, which carries the head B, is journaled. The mandrel consists of a shaft 3, which may be hollow, as shown in the drawings, and a sleeve 4, which is adapted to oscillate thereon. The rear end of the shaft is provided with a groove 5, which is engaged by a key 6 upon the hub 8 of a worm-gear 7. 9 denotes another worm-gear, which is keyed to the sleeve.

The head is constructed as follows: At the end of the shaft is a disk 10 and at the end of the sleeve a disk 11. 12 denotes a ring having upon its inner face a circle of bevel gear-teeth. This ring is detachably secured to disk 11 on sleeve 4. I preferably attach the ring to the disk in the manner shown in the drawings—that is, by means of bolts 13, having elongated heads 14. These bolts pass through openings in the disk, the heads thereof engaging a circular undercut groove 15 in the back of the ring, the bolts being given a quarter-turn to cause the heads to engage and the parts being drawn together and locked by tightening up nuts 13$^a$ at the outer ends of the bolts. The other parts of the head are attached to disk 10 on shaft 3. Within ring 12 is a plate 16, which I have shown as provided at its edge with a flange 17, and with webs 18, which are provided with screw-holes. Outside of ring 12 is a ring 19, to which the face-plate 20 is secured by screws 21. The central opening through the shaft extends likewise through plate 16 and through the face-plate, said opening being designated by 22. 23 denotes jaws, which may, of course, be of any ordinary or preferred construction. The shanks of the jaws pass through slots 24 in the face-plate, said slots extending into the central opening. 25 denotes threaded openings in the shanks of the jaws, which are engaged by corresponding threads on carrying-rods 26. These carrying-rods lie in half-sockets 28 in ring 19 and the face-plate and are provided with bevel-gears 27, which engage the bevel-teeth on ring 12. The outer ends of the carrying-rods are squared, as at 26$^a$, to receive a key for a purpose presently to be described. The parts of the head are held together by the usual screws 29, which pass through the face-plate through the web and plate 16 and engage disk 10.

I have described the mechanism of a chuck in order to make clear one use to which I contemplate applying my invention. It should be understood, however, that the chuck mechanism is not of the essence of my invention.

Power is applied and the jaws are opened and closed in the manner which I will now describe.

30 denotes the power-shaft, which in use is provided with a belt-pulley, the belt not being shown, with a wide gear 31 and with a worm 32, which engages worm-gear 7 on shaft 3.

33 denotes a shaft mounted on a slide 34, which is adapted to reciprocate in the base. Shaft 33 is provided with a gear-wheel 35, which engages wide gear 31, and with a worm 36, which engages worm-gear 9 on sleeve 4.

37 denotes brackets cast integral with or secured to the base in which the power-shaft is journaled. As the special means by which the slide is reciprocated forms no portion of my present invention, I have simply shown an arm 38 as extending downward from said slide through a slot in the base and a rod 39 as pivoted to said arm. It will be seen that gears 31 and 35 are the same diameter, and likewise the two worm-gears, so that under ordinary circumstances the movement of shaft 3 and sleeve 4 is precisely the same, the shaft being carried by one worm-gear and the sleeve by the other. Suppose, however, that it is desired to open or close the jaws, it is obvious that when the slide is moved the effect will be to either accelerate the movement of worm-gear 9 and the sleeve or else to retard it. As seen in Fig. 1, the slide is shown as moved toward the front, the effect of which is to move the jaws to their open or retracted position. To close the jaws, the slide is simply moved in the opposite direction, gear 35 sliding along gear 31, but remaining in engagement therewith. The effect of this movement is to accelerate the movement of the sleeve, disk 11, and ring 12, the latter being the ring having the bevel gear-teeth, which are engaged by bevel-gears 27 on the carrying-rods. This movement carries the jaws toward their closed position until stopped by their limit of movement or by engagement with the article to be carried. As soon as the jaws, ring 12, and the sleeve become stationary the parts of the chuck rotate together, as before, the movement of the shaft and the parts carried thereby being at all times uniform. To close the jaws again, the slide is moved toward the position shown in the drawings, causing the jaws to move backward and release the article they had been gripping, this movement necessarily resulting from the fact that the movement of worm-gear 9 and the sleeve is for an instant retarded. Should the operator desire at any time to use the chuck in the ordinary manner—that is, to make no use of my novel opening and closing device—it is simply necessary to loosen nuts 13$^a$ sufficiently to disconnect disk 11 and ring 12 and apply a suitable key to the squared end of either of the carrying-rods. Rotation of the carrying-rod to which the key is applied will, through the engagement of bevel-gears 27 with the teeth on ring 12, move the jaws inward or outward simultaneously.

Having thus described my invention, I claim—

A mechanical movement consisting of a power-shaft having a worm 32 and a gear 31, a slide carrying a shaft having a worm 36, and a gear meshing with gear 31 and adapted to slide longitudinally of said gear, a shaft carrying a gear-engaging worm 32, and a sleeve adapted to oscillate on said shaft and carrying a gear-engaging worm 36, so that normally said shaft and sleeve will rotate together, but when the slide is moved the sleeve will be oscillated on the shaft and its movement either accelerated or retarded relatively to said shaft.

In testimony whereof I affix my signature in presence of two witnesses.

JAMES GREGORY.

Witnesses:
A. M. WOOSTER,
EDITH G. ELY.